United States Patent Office 3,196,130
Patented July 20, 1965

---

3,196,130
PROCESS FOR THE MANUFACTURE OF COPOLYMERS OF ACROLEIN AND ACRYLONITRILE
Wolfgang Göltner, Kriftel, Taunus, and Paul Schlack, Leitershofen, near Augsburg, Germany, assignors to Farbwerke Hoechst Aktiengesellschaft vormals Meister Lucius & Brüning, Frankfurt am Main, Germany, a corporation of Germany
No Drawing. Filed Sept. 7, 1960, Ser. No. 54,355
Claims priority, application Germany, Sept. 9, 1959,
F 29,342
6 Claims. (Cl. 260—73)

The present invention relates to a process for the manufacture of copolymers of acrolein-acrylonitrile.

It is known that acrolein can be copolymerized with acrylonitrile in an aqueous solution in the presence of radical polymerization initiators to yield products which are soluble in aqueous sulfurous acid. As an especially active redox system the combination potassium persulfate/silver nitrate has been proposed (cf. W. Kern, R. C. Schulz, H. Cherdron, Makromol. Chem. 28, 197 to 208 (1958), 24, 144 (1957)). By means of this system, copolymers which contain up to 30% of acrylonitrile and are completely soluble in aqueous sulfurous acid, can be obtained with a good conversion. In order to produce copolymers containing a higher, and especially a predominant proportion of acrylonitrile, while maintaining a good solubility in aqueous sulfur dioxide, the polymerization must be interrupted already after small conversions. Such a process, however, is not applicable in industry because of its being uneconomical. Besides, the copolymers so produced have a less uniform structure, due to branchings and possibly partial cross-linking, facts which considerably impair the applicability in industry. Furthermore, it is described in the literature that by the redox polymerization of acrolein, using systems containing tertiary butyl-hydro-peroxide, only small conversions could be achieved (cf. Schulz et al., Makromol. Chem. 24, 1944 (1957)).

Now we have found that substantially linear copolymers of acrylonitrile and acrolein which are soluble in aqueous sulfurous acid and contain a predominant proportion of acrylonitrile, for example between 60 and 80%, calculated on the weight of the copolymer, can be made by copolymerizing a mixture consisting of at least 50% by weight of acrylonitrile, the remainder being acrolein, and preferably 60 to 80% by weight of acrylonitrile and 40 to 20% by weight of acrolein by precipitation polymerization in water as solvent for the monomers and as precipitant for the copolymers. According to the invention, the reaction is initiated by redox systems containing compounds of the general formula R—OOH as oxidizing agents, in which R represents an aliphatic, cycloaliphatic or araliphatic radical, for example the tertiary butyl-, cyclohexyl-, methylcyclopentyl-, pinyl-, p-menthyl-, cumyl-, 1-hydroxy - dicyclohexylperoxide-, decahydronaphthyl- and tetrahydro-naphthyl radical. The process of the invention yields products of valuable properties at high conversions, i.e. at least 70%, generally 70 to 95% of the theoretical, especially when the polymerization is started only with a part of the monomer mixture, for example 10 to 50% by weight and the remaining portion of monomers is then added, according to the speed of polymerization, in a manner such that the monomers are always present in aqueous solution. As hydro-peroxides there may suitably be used, for example: tertiary butyl-hydro-peroxide, cumene-hydro-peroxide, tetrahydronaphthalene-hydro-peroxide or pinane-hydro-peroxide. As reducing agents, alkali metal salts, preferably the sodium- or potassium salts of sulfurous or pyrosulfurous acid or rongalite (sodium formaldehyde sulfoxylate), benzoin or sugar may be used. Other reducing agents usual in the redox polymerization may also be used. Generally, equimolar quantities of oxidant and reducing agent are used. Alternatively, systems containing more than one oxidizing and/or more than one reducing component may be used. The combination of tertiary butyl-hydro-peroxide and sodium-meta-bisulfite is especially advantageous. The concentration of the initiators may vary within wide limits; for example, 1 to 8 millimols of redox system may act upon 1 mol of the monomer mixture. In special cases, larger or smaller quantities of redox systems may be used, a quantity of 3 to 4 millimols of the redox system, acting as polymerization initiator, per 1 mol of the total of monomers being especially suitable. It is advisable first to add the oxidizing agent and then the reducing agent. After a conversion of about 40 to 50%, it is advantageous to add a further 2 to 4 millimols of redox system, proceeding such that the oxidizing component is added at once whilst the reducing agent is continuously dropped in. The suitable quantity of initiators to be used depends on the experimental conditions, for example, on the ratio and concentration of monomers. Within the range stated, the optimum has to be determined by experiments.

According to the invention, the monomer concentration in water is chosen such that the ratio by weight of monomers to water ranges from 1:3 (especially with a monomer ratio of acrolein to acrylonitrile of 30:70) to 1:14, preferably from 1:5 to 1:10. The amount of water is to be adjusted to the monomer ratio used in a given case. With a monomer ratio of acrolein to acrylonitrile of 20:80, it is advantageous to operate in a relatively strong dilution. The rate at which the monomers are added influences the solubility in aqueous sulfur dioxide of the copolymers formed and also the yield of the copolymers. It is advisable first to introduce 10 to 50% of the monomer mixture and then to drop in the remaining portion such that the monomers are always in an aqueous solution and not temporarily dispersed. The uniform addition of the monomers advantageously takes about 4 to 6 hours, calculated from the beginning of the polymerization. This interval is given only as a guide since with every other monomer ratio an adjustment is necessary; with an extreme monomer ratio of 20:80 it is advisable to drop in the monomer mixture as slowly as possible, suitably within 4 to 6 hours. The pH-value in the reaction mixture is maintained between 2.2 and 6.5, preferably between 3 and 6. The polymerization is generally carried out at a temperature ranging from 0° to 50° C.; in special cases, however, the polymerization may also be carried out below or above this temperature. Especially favorable results are obtained at a temperature within the range of 35° and 45° C. When proceeding within the preferred range of temperature, the polymerization is terminated after 3 to 8 hours, a conversion of 75 to 95% of the theory being achieved. At lower temperatures, the speed of conversion is slower.

The polymers are obtained in a finely divided form. When operating in a greater dilution, it is therefore advantageous to completely precipitate the reaction product by adding inorganic salt solutions. As salts there may be used, for example, sodium chloride, sodium sulfate, sodium phosphates or aluminum sulfate.

The polymers obtained according to the process of the invention are distinguished by an especially uniform, substantially linear structure. They may be worked up, for example, into films and filaments. As adducts of sulfur dioxide, especially, they may be worked up into fibers and foils according to US-Patent No. 3,084,992 granted April 9, 1963, on application Ser. No. 42,757 filed July 14, 1960.

The reactivity of the carbonyl- and nitrile groups permits numerous conversions known in themselves, for instance, acetalizing, disproportioning, hydrogenating, hydrolyzing, conversion to oximes, whereby products can be obtained which may be used as raw materials for lacquers and varnishes, as textile auxiliaries, cross-linking agents, ion exchangers and tanning agents.

The following examples serve to illustrates the invention but they are not intended to limit it thereto, the parts and percenages being by weight unless otherwise stated.

*Example 1*

In a flask provided with a stirrer, reflux condenser, thermometer, 2 dropping funnels and an inlet tube, 5.6 parts of acrolein, 21.2 parts of acrylonitrile and 0.36 part of tertiary-butyl-hydro-peroxide were dissolved at room temperature in 665 parts of water while stirring and introducing nitrogen. Then, within two hours, a mixture of 5.6 parts of acrolein and 21.2 parts of acrylonitrile and simultaneously a solution of 0.76 part of sodium-meta-bisulfite in 25 parts of water were added dropwise to the batch at 40° C.

Then 0.18 part of tertiary-butyl-hydro-peroxide disolved in 25 parts of water was added to the reaction mixture at once, and, in the course of a further hour, 0.38 part of sodium-meta-bisulfite dissolved in 25 parts of water was added dropwise. Subsequently the batch was stirred for an hour at 40° C. Then the polymer was precipitated with a 40% solution of aluminum sulfate, filtered with suction and washed with a large amount of water. The white product was dried in vacuo over sulfuric acid at room temperature. A yield of 47 parts=87% of the theory was obtained.

$\eta_{rel}$=1.34.
Nitrogen content (determined according to Kjeldahl): 18.6%.

*Example 2*

In an apparatus as described in Example 1, a mixture of 8.4 parts of acrolein and 18.5 parts of acrylonitrile was added dropwise at 40° C. in 5 hours to a solution containing 8.4 parts of acrolein, 18.5 parts of acrylonitrile, 0.36 part of tertiary butyl-hydro-peroxide and 0.076 part of sodium-meta-bisulfite in 300 parts of water, while stirring and introducing nitrogen. Simultaneously, 0.684 part of sodium-meta-bisulfite disoslved in 22.5 parts of water were added dropwise. Then, 0.18 part of tertiary butyl-hydro-peroxide dissolved in 25 parts of water and subsequently, in the course of 1 hour, 0.38 part of sodium-meta-bisulfite dissolved in 25 parts of water were added to the reaction mixture. Thereafter, the batch was allowed to polymerize for a further hour, at 40° C.

It was worked up as described in Example 1 with 500 cc. of a solution of sodium sulfate which had been saturated with sodium sulfate in the hot. After drying in vacuo at 25° C., 50 parts=93% of the theory of a white polymer were obtained which was completely soluble in aqueous sulfurous acid.

$\eta_{rel}$=1.33.
Nitrogen content (determined according to Kjeldahl): 17.8%.

*Example 3*

8.4 parts of acrolein, 18.5 parts of acrylonitrile, 0.36 part of tertiary butyl-hydro-peroxide and 0.076 part of sodium-meta-bisulfite were dissolved in 297 parts of water. In the course of 4 hours a mixture of 8.4 parts of acrolein and 18.5 parts of acrylonitrile was added dropwise at 40° C. while stirring and introducing nitrogen. Simultaneously, 0.684 part of sodium-meta-bisulfite dissolved in 22.5 parts of water was dropped in within 3 hours. The batch was allowed to polymerize for three hours; then, 0.18 part of tertiary butyl-hydro-peroxide dissolved in 25 parts of water was introduced in the course of 2 hours 0.38 part of sodium-meta-bisulfite dissolved in 25 parts of water was added dropwise. Subsequently, the reaction mixture was polymerized for a further hour at 40° C. The reaction product was precipitated with 500 parts of water, filtered with suction, washed with water and dried in vacuo at room temperature.

Yield: 50 parts=93% of the theory.

The colorless, pulverulent polymer was completely soluble in aqueous sulfurous acid.

$\eta_{rel}$=1.17.
Nitrogen content (determined according to Kjeldahl): 18.3%.

*Example 4*

1.1 parts of acrolein, 4.2 parts of acrylonitrile and 0.36 part of tertiary butyl-hydro-peroxide were dissolved at 40° C. in 665 parts of water while stirring and introducing nitrogen. Within two minutes this solution was mixed with 0.076 part of sodium-meta-bisulfite dissolved in 2.5 parts of water. Then, in the course of 2½ hours, a mixture of 10.1 parts of acrolein and 38.3 parts of acrylonitrile and simultaneously, in the course of 2 hours, 0.684 part of sodium-meta-bisulfite dissolved in 22.5 parts of water were added dropwise. The batch was allowed to polymerize for two hours; then 0.18 part of tertiary butyl-hydro-peroxide dissolved in 25 parts of water was added and subsequently 0.38 part of sodium-meta-bisulfite dissolved in 25 parts of water were added dropwise in the course of one hour. The addition of the initiator being terminated after three hours, the batch was allowed to polymerize for a further hour. It was worked up as described in Example 1.

Yield: 52 parts=97% of the theory.

The product was soluble in aqueous sulfur dioxide except for a slight turbidity.

$\eta_{rel}$=1.31.
Nitrogen content (determined according to Kjeldahl): 18.8%.

*Example 5*

8.4 parts of acrolein, 18.5 parts of acrylonitrile and 0.36 part of tertiary butyl-hydro-peroxide were dissolved at room temperature in 665 parts of water while stirring and introducing nitrogen. The solution was heated to a temperature of 40° C. Then, 2.57 parts of a solution of 0.76 part of sodium-meta-bisulfite in 25 parts of water was added dropwise within 2 minutes. After an induction period of 5 minutes, a mixture of 8.4 parts of acrolein and 18.5 parts of acrylonitrile and the residual 23.2 parts of the above-mentioned solution of sodium-meta-bisulfite were simultaneously added in the course of 4 hours.

The batch was allowed to react for 4 hours; then, 0.18 part of tertiary butyl-hydro-peroxide dissolved in 25 parts of water was added to the reaction mixture and in the course of one hour 0.36 part of sodium-meta-bisulfite dissolved in 25 parts of water was added dropwise. After having added the initiator solution, the batch was allowed to polymerize for a further hour at 40° C. It was then worked up as described in Example 1.

Yield: 41 parts=77% of the theory.
$\eta_{rel}$=1.20.
Nitrogen content (determined according to Kjeldahl): 17.8%.

From a 10% solution of the polymer in aqueous sulfurous acid a film was prepared; after drying for 15 hours at room temperature this film possessed a tensile strength of 970 kg./cm.$^2$, the elongation at break being 4%, calculated on the initial length.

*Example 6*

In an apparatus as described in Example 1, 680 parts of water were mixed, at 40° C., with a solution of 1.34 parts of pinane-hydro-peroxide in 4.5 parts of acrolein and 6.4 parts of acrylonitrile, while stirring and introducing nitrogen. To this mixture a solution of 2.28 parts of sodium-meta-bisulfite in 60 parts of water was added within 5 hours. Simultaneously, 40.3 parts of acrolein and 57.2 parts of acrylonitrile were added slowly and dropwise, within 5 hours, to the reaction mixture maintained at a temperature of 40° C. After 4 hours, the batch was mixed with 0.67 part of pinane-hydro-peroxide and stirred for a further 1½ hours. The polymer was worked up as described in Example 1 and dried at room temperature in vacuo over sulfuric acid.

Yield: 79 parts=73% of the theory.
$\eta_{rel}$=1.95.
Nitrogen content (determined according to Kjeldahl): 15.2%.

*Example 7*

Within 5 hours a solution of 1.14 parts of sodium-meta-bisulfite in 60 parts of water was added slowly and dropwise, at 40° C., while stirring and introducing nitrogen, to a mixture of 680 parts of water, 2.2 parts of acrolein, 3.1 parts of acrylonitrile and 0.61 part of cumene-hydro-peroxide. After a reaction period of 4 hours, a further 0.3 part of cumene-hydro-peroxide was added. Then, the mixture was stirred for a further 2½ hours at 40° C. and subsequently mixed with 740 parts of a 40% solution of aluminum sulfate. The polymer was filtered off with suction, washed with water and dried in vacuo over sulfuric acid at room temperature.

Yield: 52 parts=96% of the theory.
$\eta_{rel}$=1.43.
Nitrogen content (determined according to Kjeldahl): 15.3%.

In all the examples, the viscosity was determined in a 1% solution of the copolymer in 10% sulfurous acid according to the working method of W. Kern et al. (Makromel. Chem. 24, 151 (1957)).

We claim:

1. A process for the manufacture of substantially linear copolymers of acrylonitrile and acrolein monomers which are soluble in aqueous sulfurous acid and contain a predominant proportion of acrylonitrile, which comprises the step of copolymerizing in water, as solvent for the monomers, at a temperature within the range of 0° to 50° C. and at a pH-value within the range of 2.2 to 6.5 a mixture of acrylonitrile and acrolein, said mixture consisting of at least 50% by weight of acrylonitrile, the remainder being acrolein, and the ratio by weight of said monomers to water is within the range of 1:3 to 1:14, in the presence of 1 to 8 millimols, calculated upon 1 mol of the monomer mixture, of a redox system as a polymerization initiator, said redox system containing at least one compound of the general formula

R—OOH as oxidizing agent, wherein R represents a member selected from the group consisting of aliphatic, cycloaliphatic and araliphatic radicals, and at least one reducing agent selected from the group consisting of alkali metal salts of sulfurous acid, alkali metal salts of pyrosulfurous acid, sodium formaldehyde sulfoxylate, benzoin and sugar.

2. A process as defined in claim 1, wherein the proportion of acrylonitrile in the monomer mixture is between 60 and 80% by weight.

3. A process as claimed in claim 1, wherein the reducing agent of the redox system is added simultaneously with the monomers.

4. A process as claimed in claim 1, wherein a redox system consisting of tertiary butyl-hydro-peroxide and sodium-meta-bisulfite is used as polymerization initiator.

5. A process as claimed in claim 1, wherein copolymerization is carried out at a temperature within the range of 35 to 45° C.

6. A process as claimed in claim 1, wherein the polymerization is carried out at a pH-value within the range of 3 to 6.

References Cited by the Examiner

UNITED STATES PATENTS 2,657,192  10/53  Miller et al. _____ 260—67

FOREIGN PATENTS 1,071,339  12/59  Germany.

OTHER REFERENCES

Kern et al.: Makromal. Chem. 28, page 197–208 (1958).
Kern et al.: Makromal. Chem. 24, page 144 (1957).

WILLIAM H. SHORT, *Primary Examiner.*

HAROLD N. BURSTEIN, *Examiner.*